No. 829,707. PATENTED AUG. 28, 1906.
J. W. FRIES.
MACHINE FOR TREATING AIR.
APPLICATION FILED SEPT. 28, 1905.

Witnesses:

Inventor:
John W. Fries
By his atty

UNITED STATES PATENT OFFICE.

JOHN W. FRIES, OF WINSTON SALEM, NORTH CAROLINA.

MACHINE FOR TREATING AIR.

No. 829,707.          Specification of Letters Patent.          Patented Aug. 28, 1906.

Application filed September 28, 1905. Serial No. 280,437.

*To all whom it may concern:*

Be it known that I, JOHN W. FRIES, of Winston Salem, county of Forsyth, State of North Carolina, have invented an Improvement in Machines for Treating Air, of which the following is a specification.

My invention has reference to machines for treating air; and it consists of certain improvements which are fully set forth in the following specification and shown by the accompanying drawings, which form a part thereof.

My invention has for its object to provide means for humidifying air for factories and other places, for cleansing and purifying the air, and when necessary impregnating it or bringing it in contact with chemicals for disinfecting, drying, or charging it with compounds, as may be desired. Heretofore I have constructed machines of this kind, but they required pipe connections for inflow and outflow of water, as illustrated in Letters Patent No. 772,655, dated October 18, 1904, and experience has shown that this plumbing was a serious objection at many places where they cannot easily make the connections and generally objectionable because of the cost of the pipe and fittings. By my present invention I provide an apparatus in which these pipes and fittings are dispensed with and the apparatus is self-contained, so that it can be located in any position found convenient and dispense entirely with plumbing of every description.

My invention consists of a drum closed at one end and open at the other, the latter being provided with an inwardly-directed funnel, combined with a fan arranged within the drum between its closed end and the funnel, and a receptacle for water or chemicals formed adjacent to the forward or large end of the funnel and over which the air is drawn by the fan.

My invention also comprehends providing the drum with a discharge-orifice for the air at a distance from the fan and an air-orifice in the large end of the funnel over the receptacle for causing a rotary action to the air to be set up while passing over the water or chemicals in the receptacle, whereby more intimate contact of said water or chemicals with the inflowing air is assured.

My invention also embodies details of construction which, together with the features above specified, will be better understood by reference to the drawings, in which—

Figure 1:
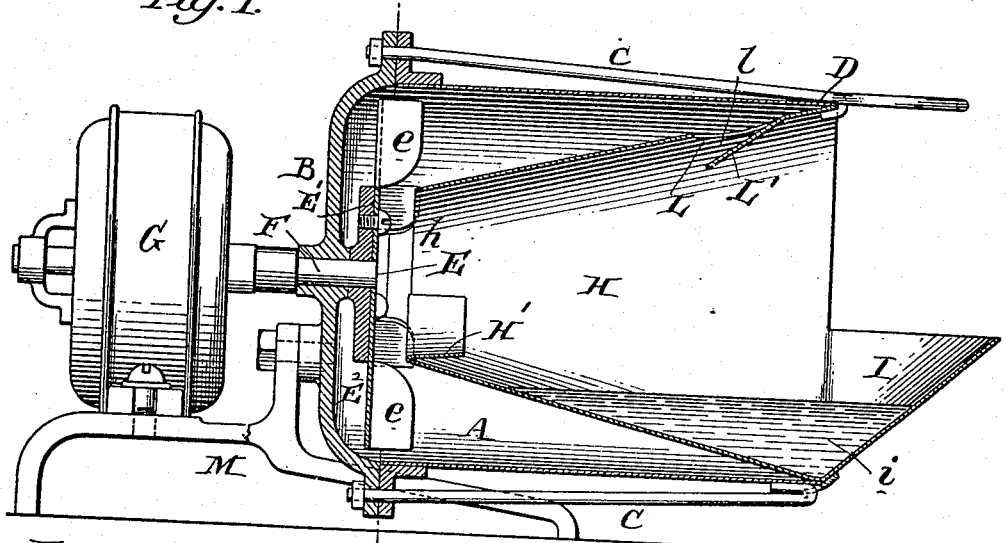
Figure 2:
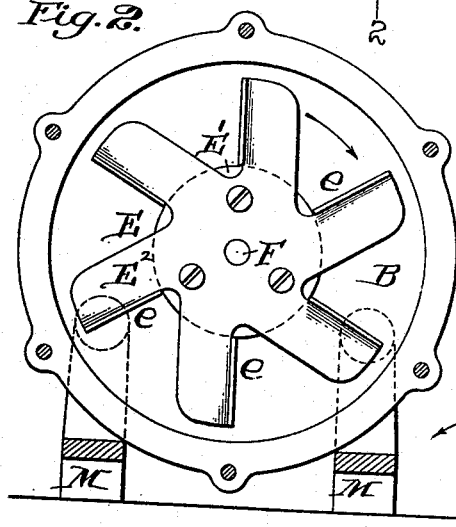
Figure 3:
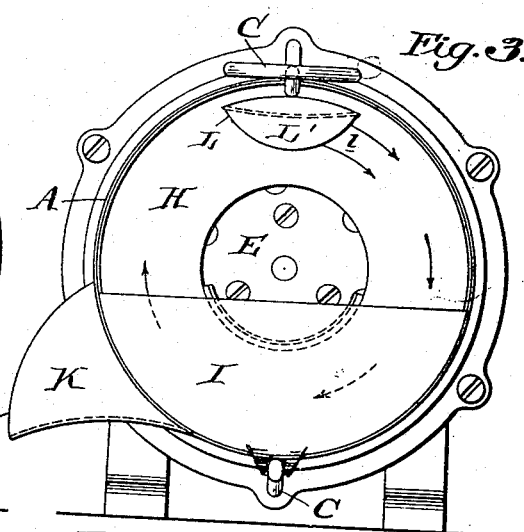
Figure 4:
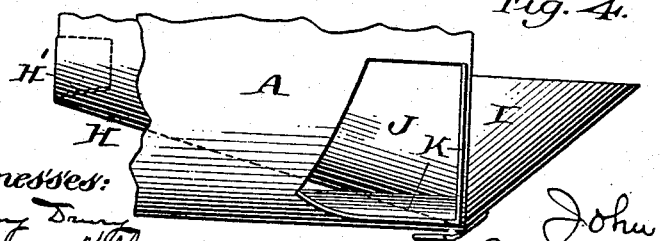

Figure 1 is a longitudinal sectional elevation of my improved machine. Fig. 2 is a transverse section of same on line 2 2 of Fig. 1. Fig. 3 is a front elevation of the machine, and Fig. 4 is a side elevation of a portion of the machine.

The machine consists, essentially, of a sheet-metal drum A, closed at one end, where it is secured to a cast or other metal head B by clamps C and open at the other end D. A fan E is placed inside of the drum at or near the closed end B. This fan has a cast-iron back E′, to which is secured a disk of sheet metal E², having a part $e$ bent forward to form radial blades. The planes of the blades $e$ preferably pass through the fan-shaft F. The shaft F and its fan may be driven by an electric motor G or usual band-wheel, as desired.

At the open end of the drum A a sheet-metal funnel H is fastened, its diameter at that point being the same as that of the drum. This funnel is of such dimensions and shape that it extends inward, is concentric with the drum, and ends near the fan in an orifice $h$, whose diameter is approximately half that of the drum. At the open end of the drum and funnel is placed a segment I, of sheet metal, fastened about the lower half of the periphery of the orifice of the drum A and funnel H and so shaped that it, with the lower part of the funnel, forms a pan or vessel $i$ for the reception of water or chemicals. The funnel H is provided adjacent to the lower part of its orifice $h$ with a guard H′ to prevent water being splashed or drawn over the funnel into the drum. In the side of the drum A, under the largest part of the funnel, is an opening J for the egress of air, this opening being preferably provided on the outside of the drum with blades K for directing the flow of the current of air emerging from the opening. In the upper part of the funnel H, near the entrance, is a semicircular cut L, the flap L′ from which is bent downward to regulate the size of the hole $l$, so made, and the direction of the flow of air passing through it.

M is a frame bolted to the back D of the drum and also to the electric motor for uniting these two parts in proper relative position and also has downwardly-projecting portions constituting feet by which the apparatus as In this manner the apparatus may be located anywhere found convenient and the flexible electric wires connected with the electric motor for operating it. The apparatus is therefore very portable and convenient for use in places where temporary use is only required at one particular point or place.

The operation of the apparatus will now be understood. The fan E is driven by the electric motor G or other suitable power and sets up a violent whirling motion in the drum. This whirl of the air occurs between the drum A and the funnel H and the air finally escapes tangentially through the opening J, provided for the purpose, and therefore air enters constantly through the funnel H and passes over the water or chemicals in the pan $i$, formed by the funnel H and the extra segment I of metal and in its passage absorbing some of the said water or chemicals. To intensify the latter action and keep the chemicals and water agitated, a portion of the whirling air is caused to pass through the opening $l$ in the funnel H, as indicated by arrows in Fig. 3, follow the sides of the funnel so as to strike the water or chemicals in the pan $i$, and at the same time give a whirling action to the air passing toward the fan through the funnel. This action causes incoming air to be brought into contact with the water or chemicals to a greater extent than would otherwise occur.

By causing the entering air to take on a whirling or rotary motion not only is it more uniformly impregnated with the moisture or chemicals, but it is in a better condition for treatment by the fan. The disturbance of the air is so positive and active that the desired degree of humidity and circulation can be had with a machine of relatively small size. When the machine is used for disinfecting purposes, the chemicals are placed in the pan $i$ instead of water, and likewise where it is used for drying air the drying chemicals are placed in the pan.

The machine is self-contained and may be located anywhere found convenient and at a minimum cost, since there is no piping, fittings, or plumbing work to be done. The apparatus is simple in construction and not liable to derangement or inoperativeness even under the most severe duty.

The apparatus may be supported upon the frame M, holding its position by gravity or otherwise, or it may be bolted to a wall, post, or ceiling, as desired or found convenient. In case it is inverted the drum and funnel should be turned upon their axis so as to bring the receptacle or pan $i$ to the bottom, as will be readily understood. Of course where the pan $i$ was not required it would be immaterial as to the position of it. The funnel or tube H may be tapering or otherwise formed so long as it properly guides the air to the center of the fan; but in practice I prefer to make it tapering, as shown. The fan E is preferably made with radial blades; but the angle or shape of the blades may be varied as desired.

I do not limit myself to the details of construction shown, as they may be modified in various ways without departing from the spirit of the invention.

Having now described my invention, what I claim as new, and desire to secure by Letters Patent, is—

1. In a machine for treating air, the combination of a drum closed at one end and provided with an inwardly-directed open funnel or tube and an air-discharge opening, a rotary fan within the drum at the closed end, a shaft extending through the closed end of the drum to rotate the fan, and a lip or extension from the lower part of the funnel to form a pan at the open end of the drum over which the air is drawn in passing through the funnel to the fan.

2. In a machine for treating air, the combination of a drum closed at one end and provided with an inwardly-directed open funnel or tube and an air-discharge opening, the said funnel at its upper part provided with an air-opening to permit air to pass from the space between the funnel and drum into the funnel to meet the incoming air and impart to it a whirling motion, a rotary fan within the drum at the closed end; a shaft extending through the closed end of the drum to rotate the fan; and a lip or extension from the lower part of the funnel to form a pan at the open end of the drum over which the air is drawn in passing through the funnel to the fan.

3. In a machine for treating air, the combination of a drum closed at one end and provided with an inwardly-directed open funnel and an air-discharge opening at the other end, the small end of the funnel extending inwardly close to the closed end of the drum; and a rotary fan journaled in the closed end of the drum on an axis concentric with the funnel and occupying approximately the entire space between the funnel and the closed end of the drum.

4. In a machine for treating air, the combination of a drum closed at one end and provided with an inwardly-directed open funnel or tube and an air-discharge opening at the other end, the small end of the funnel extending inwardly close to the closed end of the drum, a rotary fan journaled in the closed end of the drum on an axis concentric with the funnel and occupying approximately the entire space between the funnel and the closed end of the drum; a shaft for the fan extending through the closed end of the drum; means to rotate the shaft; and a supporting-frame secured to the drum and to the means for rotating the shaft.

5. In a machine for treating air, the combination of a drum closed at one end and provided with an inwardly-directed open funnel and an air-discharge opening at the other end, the small end of the funnel extending inwardly close to the closed end of the drum and provided with an outwardly-directed lip to prevent liquid splashing over the inner end of the funnel and also provided at its outer or large end with a pan or receptacle adapted to contain liquid; and a rotary fan journaled in the closed end of the drum on an axis concentric with the funnel and occupying the place between the funnel and the closed end of the drum.

6. In a machine for treating air, the combination of a drum closed at one end and provided with an inwardly-directed central tube and an air-discharge opening at the other end, the inner end of the central tube extending inwardly close to the closed end of the drum provided with an outwardly-directed lip to prevent liquid splashing over the inner end of the tube and also provided at its outer or large end with a pan or receptacle adapted to contain liquid and with an aperture above the pan through which air may pass from the space between the air and central tube into the outer end of the central tube above the pan; and a rotary fan journaled in the closed end of the drum on an axis concentric with the funnel and occupying the space between the funnel and the closed end of the drum.

7. In a machine for treating air, the combination of a drum closed at one end and provided with an inwardly-directed open funnel and an air-discharge opening at the other end, the small end of the funnel extending inwardly close to the closed end of the drum provided with an outwardly-directed lip to prevent liquid splashing over the inner end of the funnel and also provided at its outer or large end with a pan or receptacle adapted to contain liquid and also provided with an aperture above the pan through which air may pass from the space between the air and funnel into the large end of the funnel above the pan, said opening being furnished with a flap adapted to be bent so as to properly direct the air; and a rotary fan journaled in the closed end of the drum on an axis concentric with the funnel and occupying the space between the funnel and the closed end of the drum.

8. In a machine for treating air, the combination of a drum closed at one end and open at the other to the atmosphere and provided with an inwardly-directed funnel having the larger end secured to the drum, a rotary fan opened at the closed end of the drum in front of the small end of the funnel, means to support a liquid or chemical adjacent to the larger or open end of the funnel, and means for directing a current of air from the space between the drum and funnel into the means for supporting the liquid, whereby the inflowing air is caused to be brought into contact with the liquid or chemicals before being received by the fan.

9. In a machine for treating air, means for supporting a liquid or chemicals, means for drawing a current of air over the said liquid or chemicals, and an air-jet for acting upon the inflowing air and cause it to assume a whirling motion while passing over the liquid or chemicals.

10. In a machine for treating air, the combination of a drum closed at one end and having an open passage-way to the atmosphere at the other, a fan arranged within the drum adjacent to its closed end and adapted to force the air in a rotary direction within the drum to the open passage-way, a central tubular portion having one end secured to the open end of the drum and the other end inwardly directed toward the fan to supply air to the fan and also provided with an aperture forming a connection between the space within the central tubular portion and the space between it and the drum adjacent to its open end, and a receptacle adjacent to the outer end of the central tubular portion and below the open passage-way through the wall of the central tubular portion whereby an air-jet for acting upon the inflowing air is provided to cause it to assume a whirling motion while passing over the liquid or chemicals in the receptacle.

In testimony of which invention I hereunto set my hand.

JOHN W. FRIES.

Witnesses:
R. M. KELLY,
M. J. EYRE.